United States Patent [19]

Caillouet, Jr.

[11] Patent Number: 4,494,755
[45] Date of Patent: Jan. 22, 1985

[54] HOLDER FOR JOYSTICK CONTROLLER FOR VIDEO GAMES

[76] Inventor: Charles W. Caillouet, Jr., 25 Tradewinds Dr., Galveston, Tex. 77551

[21] Appl. No.: 454,321

[22] Filed: Dec. 29, 1982

[51] Int. Cl.³ ............................................. A63B 71/04
[52] U.S. Cl. ........................... 273/148 B; 74/471 XY; 273/DIG. 28; 248/346; 108/43; 108/25
[58] Field of Search ............... 200/330, 331, 296, 294, 200/295, 153 K, 6 A; 74/471 XY; 273/DIG. 28, 148 B; 248/176, DIG. 7, 346; 361/347, 350, 351; 338/128; 108/23, 25, 28, 90

[56] References Cited

U.S. PATENT DOCUMENTS

| | | | |
|---|---|---|---|
| 3,461,252 | 8/1969 | Vananzi | 200/295 X |
| 3,917,275 | 11/1975 | Alpher | 108/23 X |
| 3,949,876 | 4/1976 | Bridges et al. | 220/23.8 |
| 4,120,416 | 10/1978 | Suk | 248/DIG. 1 |
| 4,124,787 | 11/1978 | Aamoth et al. | 200/6 A |
| 4,200,166 | 4/1980 | Hansen | 180/77 A |
| 4,227,238 | 10/1980 | Saito | 200/296 X |
| 4,275,611 | 6/1981 | Asher | 74/471 XY |
| 4,312,507 | 1/1982 | Smith et al. | 108/23 X |
| 4,349,700 | 9/1982 | Asher | 200/6 A |
| 4,422,640 | 12/1983 | Tamarkin | 273/DIG. 28 |

FOREIGN PATENT DOCUMENTS 121852 9/1979 Japan .......................... 273/DIG. 28

Primary Examiner—Stephen Marcus
Assistant Examiner—Ernest G. Cusick
Attorney, Agent, or Firm—Harvey B. Jacobson

[57] ABSTRACT

A holder for a joystick controller for video games, video computer systems and the like to facilitate operation of the joystick controller without developing hand cramps, muscle fatigue and muscle soreness and to provide the requisite stability and leverage needed for proper operation of the joystick controller. The holder includes a generally planar panel of convenient size having a slot or notch formed in one edge thereof for receiving the joystick controller. In one embodiment, the controller is retained in place by frictional engagement with the edges of the slot or notch. In another embodiment, the controller is retained in place by a pair of retaining straps and in a third embodiment, the controller is retained in place by a one-piece retainer with the embodiments having the two straps or the one-piece retainer secured to the upper surface of the panel and providing openings for the base of the controller and the firing button or "red" button alongside of the joystick.

18 Claims, 9 Drawing Figures

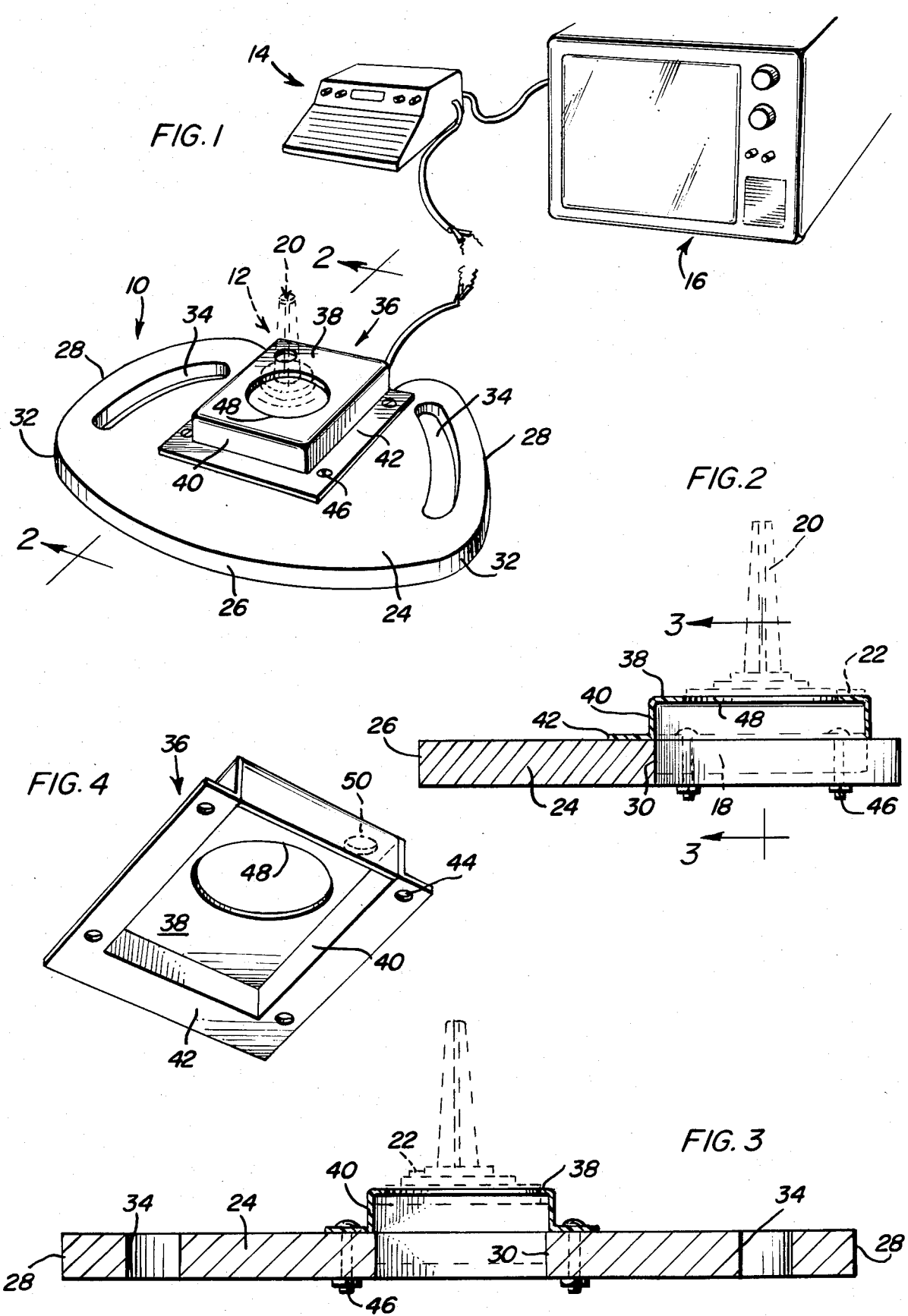

4,494,755

HOLDER FOR JOYSTICK CONTROLLER FOR VIDEO GAMES

BACKGROUND OF THE INVENTION

1. Field of the Invention

The present invention generally relates to holders for control devices and more specifically a holder for the joystick controller of a video computer system, video game or the like and includes an enlarged rigid panel having a structure incorporated therein to retain the controller thereon to facilitate proper operation of the joystick controller while maintaining fatigue, muscle cramps and muscle soreness at a minimum.

2. Description of the Prior Art

Various types of video games, video computer systems and the like have been commercially developed with such devices including a controller which includes a control stick or joystick, a firing button or red button and frequently, such controllers are portable and must be hand held while operating the video game. One type of joystick controller is disclosed in U.S. Pat. No. 4,124,787 issued Nov. 7, 1980 and is assigned to Atari, Inc., Sunnydale, Calif. The following U.S. patents disclose other types of manual control devices for various apparatuses in which the control device is in the form of a joystick and the controller may be hand held during operation.

U.S. Pat. No. 3,156,134, Nov. 10, 1964
U.S. Pat. No. 3,277,248, Oct. 4, 1966
U.S. Pat. No. 3,365,975, Jan. 3, 1968
U.S. Pat. No. 4,124,787, Nov. 7, 1978

One of the problems found to exist with joystick controllers of this type is the necessity for the controller to be held in a stable position while sufficient leverage and force is applied to the joystick for proper operation thereof with the firing button or red button also being in position for easy access. During periods of extended use, hand cramps, muscle fatigue and muscle soreness frequently occur thus reducing the control efficiency of the players.

SUMMARY OF THE INVENTION

An object of the present invention is to provide a holder for the joystick controller of a video game or computer system in the form of an enlarged rigid panel capable of being supported in a stable manner and including structural features supporting the controller thereon to facilitate proper operation of the controller and reducing hand cramps, muscle fatigue, soreness and the like thereby enabling more effective control of the joystick, red button and the like.

Another object of the invention is to provide a holder in accordance with the preceding object in which the panel is provided with a slot or notch communicating with one edge thereof for receiving the base portion of the controller with the joystick and firing button or red button being accessible above the upper surface of the panel.

A further object of the invention is to provide a holder in accordance with the preceding objects in which the controller is either frictionally held in the notch, retained in place by two retaining straps or retained in place by a one-piece retainer with all embodiments of the invention providing stable support for the controller so that the controller can be hand held with the required amount of stability and leverage needed for proper operation of the joystick controller without the hand developing cramps, muscle fatigue or muscle soreness.

Still another object of the invention is to provide a holder for the joystick controller of video games, computer systems and the like which is simple in construction, easy to manufacture, inexpensive, easy to assemble with respect to the controller and effective for providing stable support for the controller.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the holder with the joystick controller assembled therewith.

FIG. 2 is a sectional view taken substantially upon a plane passing along section line 2—2 on FIG. 1 illustrating the relationship of the holder to the joystick controller.

FIG. 3 is a sectional view taken substantially upon a plane passing along section line 3—3 on FIG. 2 illustrating further structural details of the holder and the association thereof with the controller.

FIG. 4 is a perspective view of the retainer forming a portion of the holder.

DESCRIPTION OF THE PREFERRED EMBODIMENTS

Figure 5:
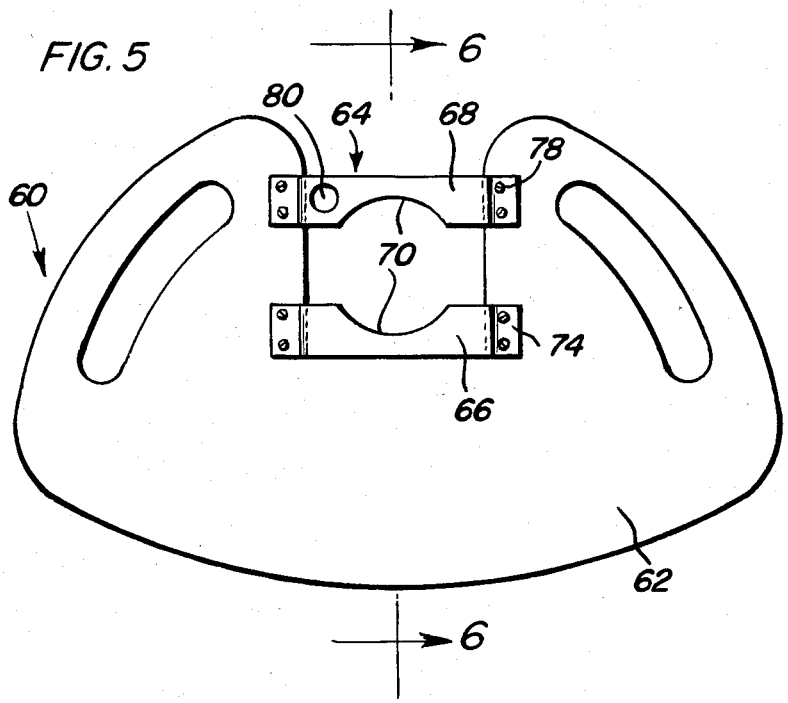
FIG. 5 is a plan view of another embodiment of the holder utilizing two retainer straps.
Figure 6:
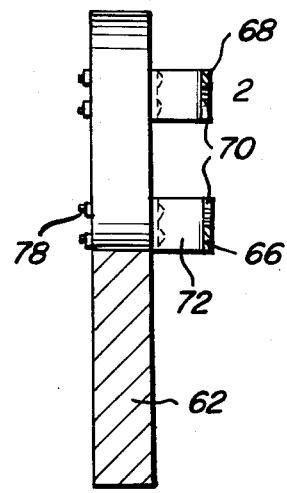
FIG. 6 is a sectional view taken substantially upon a plane passing along section line 6—6 on FIG. 5 illustrating the structural details of this embodiment of the holder.
Figure 7:
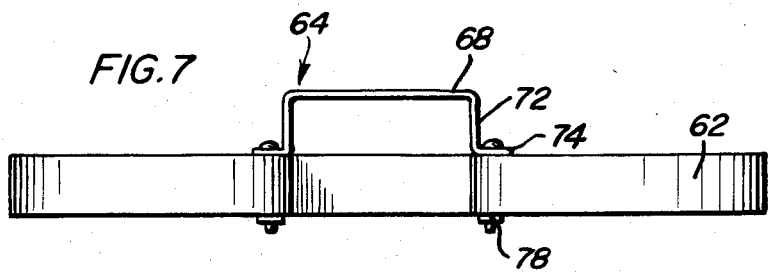
FIG. 7 is an elevational view of the holder from the edge thereof having the slot or notch which receives the controller.
Figure 8:
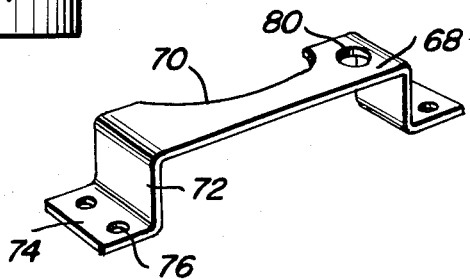
FIG. 8 is a perspective view of one of the retainer straps used in the embodiment of FIGS. 5-7.

Referring now specifically to the drawings, the holder of the present invention is generally designated by reference numeral 10 with the controller being generally designated by the numeral 12 and being connected to a control console 14 and a television set 16 which are generally illustrated schematically in FIG. 1 with it being understood that the controller 12 controls operation of a video game or video computer system or the like with the controller 12 including a base 18, an upwardly extending joystick 20 and an offset firing button or red button 22 all of which represents conventional structure such as that commercially available from Atari, Inc.

As illustrated in FIGS. 1-4, the holder 10 includes a rigid panel 24 having substantially flat or planar upper and lower surfaces. The overall plan configuration of the panel 24 is trapezoidal with one side edge thereof being rounded or convexly curved at 26 from end to end thereof and the two end edges 28 converging from the ends of the side edge 26 and also being generally rounded. The side edge opposite to the side edge 26 is shorter and provided with an inwardly extending notch or slot 30 with all of the corner areas being smoothly rounded as at 32. The slot or notch 30 is dimensioned to receive the generally rectangular base 18 of the controller 12 therein with the orientation of the joystick 20 to the panel 24 being illustrated in FIGS. 1-3. Each end of the panel 24 is provided with an elongated, arcuately curved slotlike opening 34 forming hand grips adjacent to and generally paralleling the end edges 28 as illustrated in FIG. 1 so that the two hand grips or openings 34 converge toward the side edge of the panel 24 having the slot 30 therein.

Attached to the upper surface of the panel 24 in overlying relation to the slot or notch 30 is a retainer generally designated by numeral 36 and which includes a substantially flat, rectangular top plate 38 having a depending flange 40 around the periphery thereof with three of the flanges 40 including an outwardly extending flange 42 with at least two of the flanges 42 having apertures 44 therein for receiving fasteners 46 to secure the retainer 36 to the panel 24 in bridging relation to the slot 30. As illustrated, the top plate 38 includes a large opening 48 of circular configuration to receive upwardly projecting cylindrical portion on the base 18 of the controller 12 and also enable the joystick 20 to extend above the retainer for access thereto. Additionally, the top plate 38 includes a smaller aperture 50 adjacent to the outer corner thereof through which the firing button or red button 22 projects to enable access thereto. The controller 12 is connected to the control console 14 by electrical conductors and likewise the console 14 is connected to the television set or computer system by electrical conductors in a conventional manner.

The fasteners 46 are easily removable bolts to enable easy installation of the joystick controller and the slot 30 is dimensioned to closely receive the controller base 18 to preclude relative movement between the controller 12 and the holder 10. The retainer 36 may be constructed of molded plastic material or may be stamped metal or the like and the panel may be constructed of wood, plywood, plastic or the like and while dimensions may vary the overall length of the panel 24 may be approximately 15" and the overall width approximately 9" with the slot 30 being approximately 3¼" wide and about 4½" deep. The panel 24 may be approximately ¾" thick and all of the corners are smoothly rounded and the hand grip cutouts or slots 34 enable a person to effectively hold the holder in either hand while manipulating the joystick.

FIGS. 5-8 illustrate another embodiment of the holder 60 including a panel 62 which for all purposes is identical to the panel 24 in FIGS. 1-4 but in this construction the retainer generally designated by numeral 64 includes a pair of retaining straps 66 and 68 each of which includes an arcuate notch 70 in the inner edge and depending end flanges 72 terminating in outwardly extending flanges 74 having apertures 76 therein receiving removable bolts or similar fasteners 78 so that the retaining straps or at least the outer retaining strap 68 may be easily removed to install the controller which is not shown in FIGS. 5-8. The outer retaining strap 68 is also provided with an aperture 80 adjacent one end thereof to receive the firing button or red button on the controller. In this arrangement, the retainer is constructed of two separate straps which may be of metal, rigid plastic or the like and may be formed by using any conventional manufacturing technique.

Figure 9:
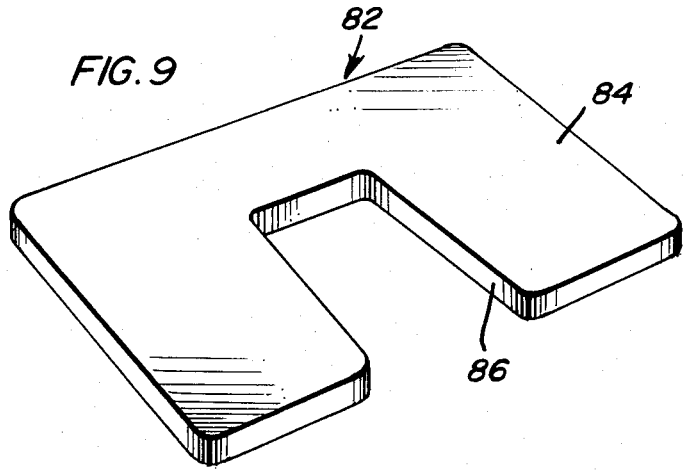
FIG. 9 is a perspective view of another embodiment of the holder in which the controller is retained in place by frictional engagement with the slotlike structure in the panel.

FIG. 9 illustrates another embodiment of the holder generally designated by the numeral 82 which includes a rectangular panel 84 having a slot or notch 86 formed therein which is constructed with the side edges thereof converging slightly inwardly toward each other for frictionally gripping the base of the controller as it is forced inwardly thereby frictionally securing the controller to the panel 84. In this embodiment, the panel may be slightly smaller but the slot structure 86 slightly deeper in order to provide for the slight inward convergence of the side walls of the slot in order to provide a wedging and gripping engagement of the side edges of the base of the joystick controller when it is forced inwardly between the side edges of the slot.

The holder provides greater stability for the joystick controller so that manipulations of the joystick become more deliberate, sensitive and accurate and reduces muscle fatigue, soreness and cramps which frequently occur during extended periods of use of the joystick controller when it is hand held. Thus, with the holder, players can more accurately and positively manipulate the joystick and also the firing button or red button.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A holder for a hand held and manually manipulable controller having a hand held base and manually movable control stick projecting upwardly therefrom, said holder comprising an enlarged rigid panel and means retaining the controller base on the panel, means on the panel to enable it to be stabilized to stabilize the controller and enabling more effective manipulation of the control stick while minimizing hand cramps, muscle fatigue, soreness and the like, said panel including generally planar top and bottom surfaces, said means retaining the controller base on the panel being located along an edge portion of the panel.

2. The structure as defined in claim 1 wherein said means retaining the controller base includes a slot in the panel, said slot extending to and communicating with an edge of the panel with the slot receiving the controller base.

3. The structure as defined in claim 2 wherein the edges of the slot extending inwardly from the edge of the panel converge slightly inwardly for frictionally and wedgingly engaging the controller base.

4. The structure as defined in claim 2 together with a pair of retaining straps attached to the panel on opposite sides of the slot and being spaced apart for engaging opposite sides of the controller base for retaining the controller in the slot and rigid to the panel.

5. The structure as defined in claim 2 together with a retainer plate attached to the panel and bridging the slot, said retainer plate having an aperture therein overlying the slot for receiving the control stick projecting from the controller base, said retaining plate overlying and engaging the controller base for retaining the controller in the slot and rigid to the panel.

6. The structure as defined in claim 5 wherein said plate is provided with depending peripheral flanges, at least two of said depending flanges having an outwardly extending flange at the lower edge thereof, means removably securing the outwardly extending flanges to the panel thereby enabling the controller to be assembled to the panel, said plate also including an additional aperture receiving a firing button on the controller base.

7. The structure as defined in claim 2 wherein said panel is provided with rounded peripheral edge surfaces, and a pair of arcuate slots forming hand grips adjacent the opposed edges of the panel to facilitate the panel and controller being held in a stable manner while manipulating the controller.

8. The structure as defined in claim 1 wherein said panel is constructed of relatively thin, lightweight material.

9. In combination with a hand held video game controller having a hand held base and a projecting control stick movably mounted on the base for manually manipulating the control stick with one hand while holding the base with the other hand, a holder for the controller to stabilize the controller and enable manipulation of the control stick with less muscle fatigue, said holder comprising a rigid panel, means mounting the controller base rigidly and removably to said panel, said panel projecting laterally from the controller base and including an area spaced from the controller base to stabilize the controller during manipulation of the control stick.

10. The combination as defined in claim 9 wherein said means mounting the controller includes a slot extending inwardly from the edge of the panel and receiving the controller base.

11. The combination as defined in claim 10 together with a retainer mounted on said panel in bridging relation to the slot and in engagement with the controller base to secure the controller to the panel.

12. The combination as defined in claim 11 wherein said retainer includes a plate having an aperture therein receiving the control stick, attachment flanges on said plate mounting the plate on the panel.

13. The combination as defined in claim 12 wherein said plate includes an opening offset from said aperture, said controller including a firing button offset from said control stick, said firing button being positioned through said opening for access thereto.

14. The combination as defined in claim 11 wherein said retainer includes a pair of retaining straps mounted in spaced relation on said panel in bridging relation to the slot and in engagement with the controller base to secure the controller to the panel.

15. The combination as defined in claim 14 wherein one of said straps includes an opening adjacent one end thereof, said controller including a firing button offset from the control stick, said firing button being positioned through said opening for access thereto.

16. The combination as defined in claim 10 wherein said slot includes inwardly converging opposed edges extending from the edge of the panel in frictional gripping engagement with the controller base when it is moved into the slot to secure the controller to the panel.

17. The combination as defined in claim 9 wherein said area spaced from the controller base to stabilize the controller includes a hand held area including at least one slot-like opening through the panel spaced from the controller base and forming a handgrip for enabling the panel to be hand held.

18. The combination as defined in claim 9 wherein said area spaced from the controller base to stabilize the controller includes a projecting portion of the panel being imperforate to enable the panel to be easily hand held to stabilize the controller during manipulation of the control stick.

* * * * *